United States Patent
Park et al.

(10) Patent No.: US 9,830,264 B2
(45) Date of Patent: Nov. 28, 2017

(54) CACHE MEMORY SYSTEM AND OPERATING METHOD FOR THE SAME

(71) Applicant: Samsung Electronics Co., Ltd., Suwon-si (KR)

(72) Inventors: Jeong-soo Park, Gwacheon-si (KR); Kwon-taek Kwon, Seoul (KR); Jeong-ae Park, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 124 days.

(21) Appl. No.: 14/499,927

(22) Filed: Sep. 29, 2014

(65) Prior Publication Data

US 2015/0095589 A1    Apr. 2, 2015

(30) Foreign Application Priority Data

Sep. 30, 2013    (KR) .................. 10-2013-0116894

(51) Int. Cl.
  *G06F 12/122*    (2016.01)
  *G06F 12/126*    (2016.01)
  *G06F 12/0831*   (2016.01)

(52) U.S. Cl.
  CPC ........ *G06F 12/0835* (2013.01); *G06F 12/122* (2013.01); *G06F 12/126* (2013.01); *G06F 2212/302* (2013.01); *G06F 2212/621* (2013.01); *Y02B 60/1225* (2013.01)

(58) Field of Classification Search
  CPC .. G06F 12/0835; G06F 12/126; G06F 12/122; G06F 2212/621; G06F 2212/302
  See application file for complete search history.

(56) References Cited

U.S. PATENT DOCUMENTS

| | | | |
|---|---|---|---|
| 5,906,000 A * | 5/1999 | Abe | G06F 12/122 |
| | | | 711/133 |
| 6,590,579 B1 | 7/2003 | Hong et al. | |
| 7,136,068 B1 | 11/2006 | Priem et al. | |

(Continued)

FOREIGN PATENT DOCUMENTS

| | | |
|---|---|---|
| KR | 10-2000-0062275 | 10/2000 |
| KR | 10-0300972 | 9/2001 |

(Continued)

OTHER PUBLICATIONS

Extended European Search Report dated Mar. 3, 2015 in counterpart European Application No. 14187114.5 (6 pages, in English).

*Primary Examiner* — Eric S Cardwell
(74) *Attorney, Agent, or Firm* — Harness, Dickey & Pierce, P.L.C.

(57) ABSTRACT

A cache memory system includes a cache memory, which stores cache data corresponding to portions of main data stored in a main memory and priority data respectively corresponding to the cache data; a table storage unit, which stores a priority table including information regarding access frequencies with respect to the main data; and a controller, which, when at least one from among the main data is requested, determines whether cache data corresponding to the request is stored in the cache memory, deletes one from among the cache data based on the priority data, and updates the cache data set with new data, wherein the priority data is determined based on the information regarding access frequencies.

22 Claims, 8 Drawing Sheets

(56) References Cited

U.S. PATENT DOCUMENTS

| | | |
|---|---|---|
| 8,018,467 B2 | 9/2011 | Solanki et al. |
| 2007/0094450 A1* | 4/2007 | VanderWiel .......... G06F 12/126 711/133 |
| 2013/0097386 A1 | 4/2013 | Lee et al. |
| 2013/0145104 A1 | 6/2013 | Hsu |
| 2015/0067266 A1* | 3/2015 | Jafri .................... G06F 12/0804 711/136 |
| 2015/0098509 A1* | 4/2015 | Sung .................... H04N 19/597 375/240.16 |

FOREIGN PATENT DOCUMENTS

| | | |
|---|---|---|
| KR | 10-2007-0069346 | 7/2007 |
| KR | 10-2009-0026124 | 3/2009 |
| KR | 10-2013-0041585 | 4/2013 |

\* cited by examiner

CACHE MEMORY SYSTEM AND OPERATING METHOD FOR THE SAME

CROSS-REFERENCE TO RELATED APPLICATIONS

This application claims the priority benefit of Korean Patent Application No. 10-2013-0116894, filed on Sep. 30, 2013, in the Korean Intellectual Property Office, the disclosure of which is incorporated herein in its entirety by reference.

BACKGROUND

1. Field

The following description relates to cache memory systems and operating methods for the same, and more particularly, to cache memory systems for reducing cache miss possibility and operating methods for the same.

2. Description of the Related Art

Generally, a processing unit, such as a CPU, reads out and processes commands or data stored in a large-capacity external memory. Most large-capacity external memory devices feature processing speeds significantly slower than that of a CPU, and thus a cache memory system is used for enhancing processing speed.

A cache memory system stores data recently accessed by a CPU, so that, when the CPU requests the same data, the CPU may access the high-speed cache memory instead of accessing an external memory. As a result, data transmission speed may be increased.

If data requested by a CPU is stored in a cache memory (referred to as a cache hit), data stored in the cache memory is transmitted to the CPU. If the data requested by the CPU is not stored in the cache memory (referred to as a cache miss), data stored in an external memory is transmitted to the CPU.

Such cache memories may be categorized based on a mapping mechanism; a set-related cache memory utilizing a set-related mapping mechanism and a direct mapped cache memory utilizing a direct mapping mechanism. If the number of sets, which is a size of a set-related cache memory, is one, the corresponding set-related cache memory may be considered to be a direct mapped cache memory. The direct mapped cache memory is the simplest form of cache memories.

SUMMARY

The following description relates to cache memory systems for reducing cache miss possibility and operating methods for the same.

In a tile-based rendering operation, for example, the probability that information regarding adjacent pixels is stored in adjacent external memory locations is generally very high. Accordingly, a cache memory system integrated in a processor may improve processing efficiency. However, because the cache memory system is generally unable to temporarily store all data found in the external memory, blocks of data stored in the cache memory must be deleted to free the cache memory to store other blocks of data from the external memory.

To determine which block of data, referred to as a victim block of data, is deleted from the cache memory, a priority may be assigned to a block of data. This priority may be based on texture data associated with the block of data, such as frequencies of types of textures used by a pixel shading program, for example. A block with a high priority may be highly likely to be used later, such that a determination may be made to delete a block of data with a low priority instead. Additionally, the victim block of data may be stored in a victim cache rather than being completely deleted.

Additional aspects will be set forth in part in the description which follows and, in part, will be apparent from the description, or may be learned by practice of the presented embodiments.

According to an aspect of the present disclosure, a cache memory system includes a cache memory, which stores cache data corresponding to portions of main data stored in a main memory and priority data respectively corresponding to the cache data; a table storage unit, which stores a priority table including information regarding access frequencies with respect to the main data; and a controller, which, when at least one from among the main data is requested, determines whether cache data corresponding to the request is stored in the cache memory, deletes one from among the cache data based on the priority data, and updates the cache data with new data, wherein the priority data is determined based on the information regarding access frequencies.

The cache memory stores tag data respectively corresponding to the cache data, the cache memory includes a plurality of data sets, and the data set include the cache data, the tag data, and the priority data.

The controller receives a tag address and a set address corresponding to the requested main data, and the controller compares tag data included in a data set indicated by the set address to the tag address and determines whether cache data corresponding to the request is stored.

If any of the plurality of tag data is identical to the tag address, the controller determine it as a cache hit and output cache data corresponding to the matched tag data to outside.

If none of the plurality of tag data is identical to the tag address, the controller determines it as a cache miss and receives the new data from a main memory region indicated by the tag address.

The priority table includes data IDs indicating the main data and data access count regarding the main data, and the controller determines the priority data, such that priority of the cache data identical to the main data increases as the data access count regarding the main data increases.

The controller receives a data ID corresponding to the requested main data and updates the priority table by increasing the data access count regarding the main data corresponding to the data ID.

The controller updates the priority data based on the updated priority table.

The cache memory system further includes a temporary storage unit, which stores the cache data deleted from the cache memory as candidate data, wherein the controller determines whether to store the cache data to be deleted as candidate data based on the priority data corresponding to the cache data to be deleted.

If a table modification request is received, the controller stores the priority table in an external memory and stores a modified priority table in the table storage unit.

If the requested main data is data necessary for processing pixels of an N+1th frame image, the initial information regarding access frequencies of the priority table includes information regarding access frequencies collected while pixels of an Nth frame image are being processed.

According to an aspect of the present disclosure, a method of operating a cache memory system includes receiving a request for one from among main data; determining whether the requested main data is stored in a cache memory; based on a result of the determination, selecting one from among cache data stored in the cache memory based on priority data respectively corresponding to the cache data; and deleting the selected cache data and updating the cache data with new data, wherein the priority data is determined based on information regarding access frequencies included in a priority table stored in the cache memory.

The receiving of the request further includes receiving a tag address and a set address corresponding to the requested main data, and the determining of whether the cache data is stored in the cache memory includes comparing a plurality of tag data included in a data set of the cache memory to the tag address and determining whether cache data corresponding to the request is stored.

The method further includes determining the priority data, such that priority of the cache data identical to the main data increases as the data access count regarding the main data increases.

The receiving of the request includes receiving a data ID corresponding to the requested main data, and the method further includes updating the priority table by increasing the data access count regarding the main data corresponding to the data ID.

The method further includes storing the cache data to be deleted as candidate data based on priority data corresponding to the cache data to be deleted.

The method further includes receiving a table modification request; and storing the priority table in an external memory and storing a modified priority table in the table storage unit.

According to an aspect of the present disclosure, a cache memory system includes a cache memory, which stores cache data corresponding to portions of main data stored in a main memory and priority data respectively corresponding to the cache data; a table storage unit, which stores a priority table including information regarding access frequencies with respect to the main data; a controller, which, when at least one from among the main data is requested, determines whether cache data corresponding to the request is stored in the cache memory, deletes one from among the cache data based on the priority data, and updates the cache data with new data; and a temporary storage unit, which stores the cache data deleted from the cache memory as candidate data based on priority data corresponding to the cache data to be deleted, wherein the priority data is determined based on the information regarding access frequencies.

If a priority of the cache data to be deleted is equal to or greater than a predetermined priority, the controller stores the cache data to be deleted in the temporary storage unit as candidate data.

If the requested data does not exist in the cache memory, the controller determines whether the requested main data exists in the temporary storage unit and, based on a result of the determination, outputs the candidate data or the main data in the main memory.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1:
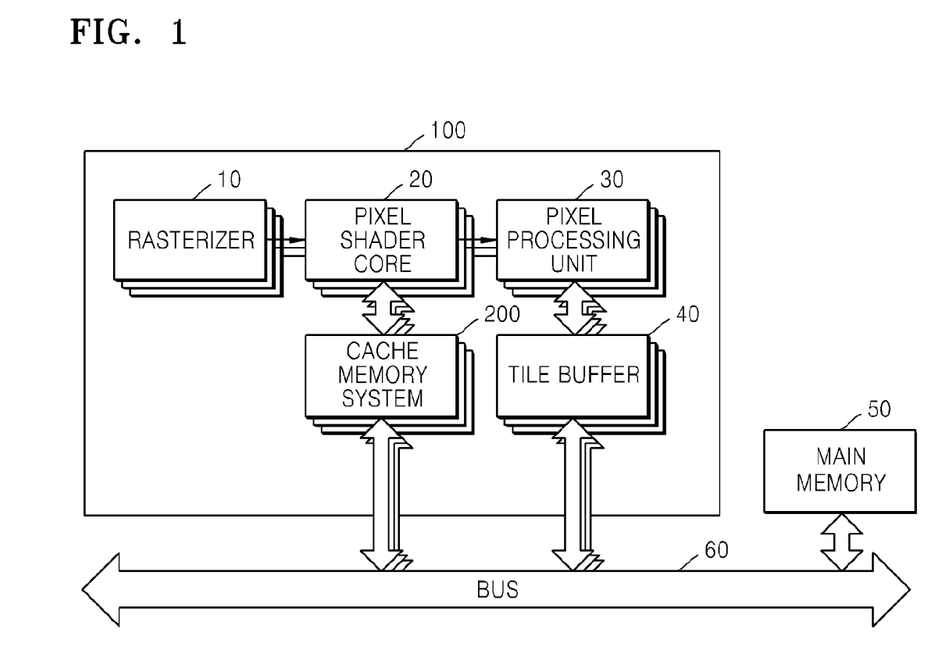
FIG. 1 is a diagram for describing a graphics processing system according to an embodiment of the present disclosure.

FIG. 1 is a diagram for describing a graphics processing system 100 according to an embodiment of the present disclosure.

Referring to FIG. 1, the graphics processing system 100 may include a rasterizer 10, a pixel shader core 20, a cache memory system 200, a pixel processing unit 30, and a tile buffer 40. Furthermore, a line of the cache memory system 200, a line of the tile buffer 40, and a line of a main memory 50 may be connected to a system bus 60.

The graphics processing system 100 may be a 3D graphics processing system. Furthermore, the 3D graphics processing system may utilize a tile-based-rendering (TBR) technique based on tiles for efficiently utilizing memory bandwidth. The TBR technique is a technique for dividing a single image into tiles of a same size, processing all pixels included in one tile in a single channel consisting of the rasterizer 10, the pixel shader core 20, and the pixel processing unit 30, processing pixels of another pixel, and so on. For example, as shown in FIG. 1, if the graphics processing system 100 includes 3 channels, a first tile, a second tile, and a third tile may be simultaneously processed at a first channel, a second channel, and a third channel, respectively. Next, a fourth tile, a fifth tile, and a sixth tile may be simultaneously processed at the first channel, the second channel, and the third channel, respectively.

Meanwhile, a 3D object included in an image may be converted into meshes, and converted mesh data may be input to the rasterizer 10. The rasterizer 10 may convert input mesh data into pixels. For example, if a 3D object is divided into triangles, the rasterizer 10 may define spatial positions of triangles constituting the 3D object as coordinates, divide each of the triangles into pixels, and determine coordinates of the pixels of each of the triangles.

The pixel shader core 20 may perform pixel shading for determining color values of pixels converted by the rasterizer 10. Here, the pixel shader core 20 requests texture data for determining color values of pixels.

Meanwhile, to request texture data, the pixel shader core 20 accesses a cache memory before accessing the main memory 50. In this case, the pixel shader core 20 transmits the request for texture data to the cache memory system 200.

When the requested texture data exists in a cache memory 230 (refer to FIG. 2), an operation regarding a cache hit is performed, and thus cache data (texture data) output from the cache memory 230 is applied to the pixel shader core 20.

It is highly probable that frequently accessed data (texture data) of the main memory 50 is stored in the cache memory 230. Therefore, the pixel shader core 20 may increase data transmission speed by accessing the cache memory 230 before accessing the main memory 50. Particularly, main data approach pattern demanded in pixel shading is highly local, and thus frequency of accessing the main memory 50 may be reduced by applying the cache memory system 200 according to an embodiment of the present disclosure.

Meanwhile, if requested main data does not exist in the cache memory 230, an operation regarding a cache miss is performed. Therefore, the main memory 50 is accessed, and data output from the main memory 50 is applied to the cache memory system 200 via the system bus 60.

Meanwhile, a result of performing pixel shading at the pixel shader core 20 is transmitted to the pixel processing unit 30. The pixel processing unit 30 performs various tests (e.g., stencil test, depth test, etc.) with respect to each pixel and determines whether to display the corresponding pixel.

As described above, results of processing pixels of respective tiles respectively at a plurality of channels (the rasterizer 10-the pixel shader core 20-the pixel processing unit 30) may be stored in the tile buffer 40. Data stored in the tile buffer 40 is transmitted to a frame buffer (not shown), and the graphics processing system 100 outputs a final image by using data regarding the respective tiles.

Although FIG. 1 shows a case in which the cache memory system 200 is arranged separately from the pixel shader core 20 for the convenience of explanation. The present disclosure is not limited thereto, and the cache memory system 200 and the pixel shader core 20 may be included together in a single chip.

Figure 2:
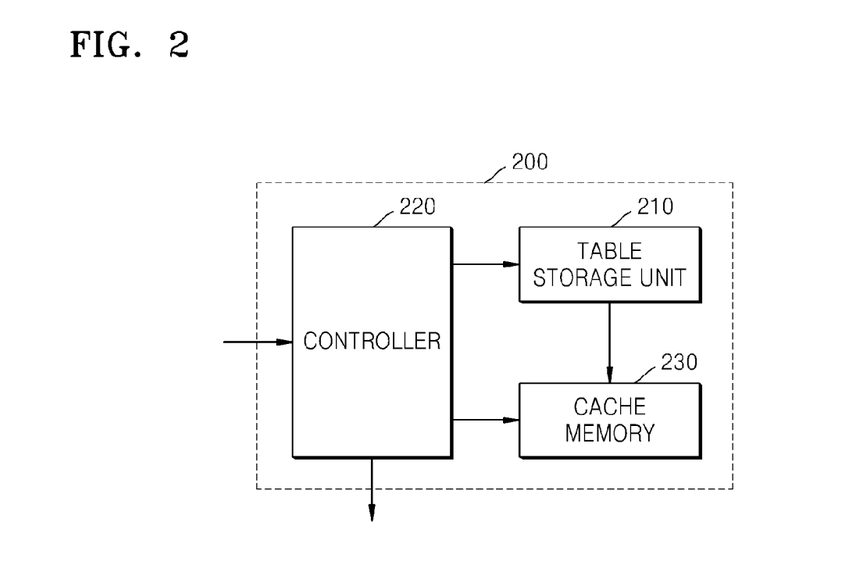
FIG. 2 is a block diagram showing a cache memory system according to an embodiment of the present disclosure.

FIG. 2 is a block diagram showing a cache memory system 200 according to an embodiment of the present disclosure. The cache memory system 200 may include a table storage unit 210, a cache memory 230, and a controller 220.

Figure 3:
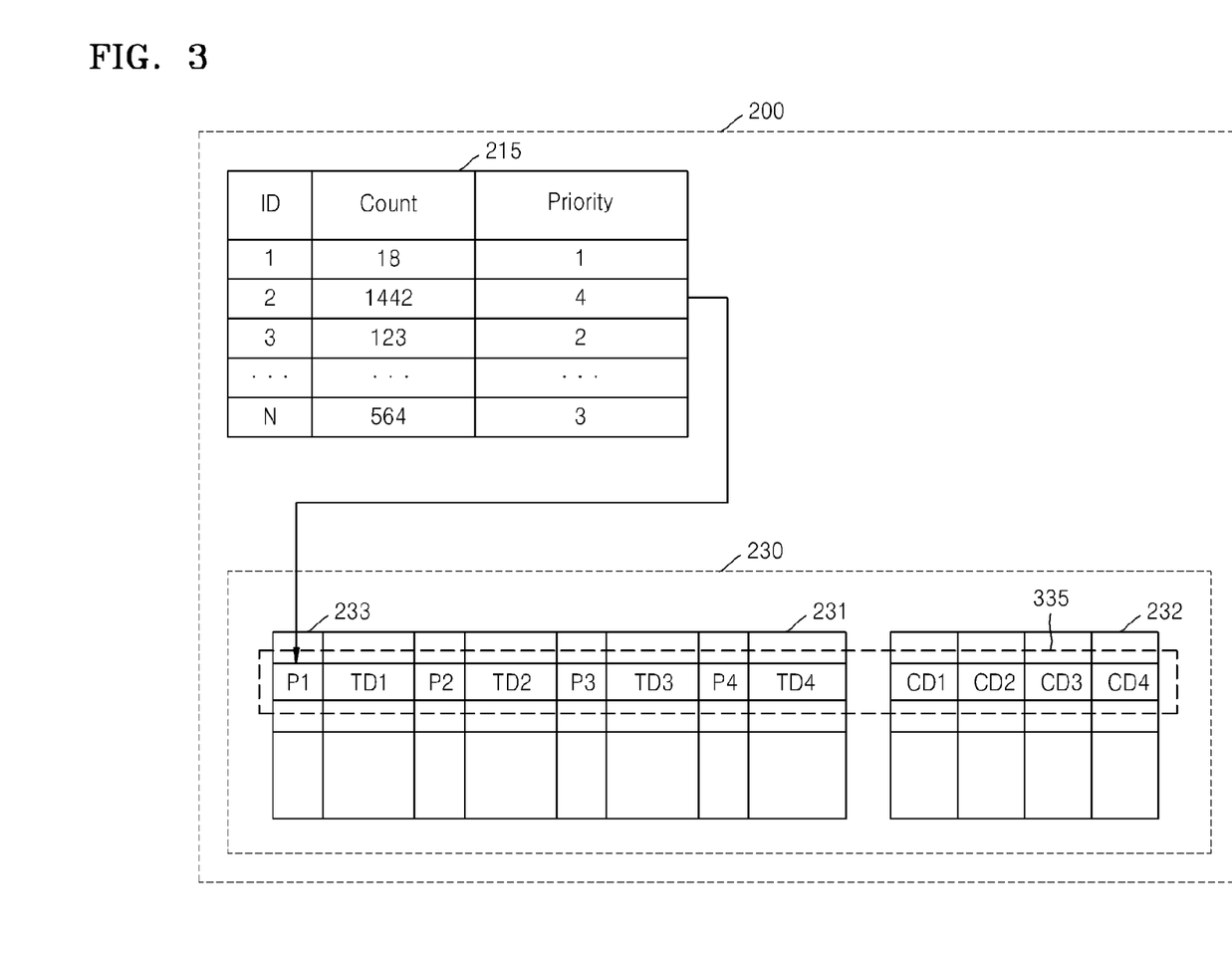
FIG. 3 is a diagram for describing a cache memory according to an embodiment of the present disclosure.

The table storage unit 210 may store a priority table which includes information regarding frequencies of accessing main data (texture data) stored in the main memory 50. For example, as shown in FIG. 3, the table storage unit 210 may include a data identifier (ID), a data access count, and priority data. The data ID is an identifier indicating corresponding main data, and the data access count is the number of times corresponding main data is accessed. The priority data indicates priorities of data based on the data access counts.

For example, if there are N types of main data, priority data of the main data corresponding to the highest data access count may be set to 1, whereas priority data for the main data corresponding to lower data access counts may be set to N. Alternatively, priority data of the main data corresponding to the highest data access count may be set to N, whereas priority data for the main data corresponding to the lowest data access count may be set to 1.

The cache memory 230 may store cache data corresponding to portions of main data stored in the main memory 50, priority data respectively corresponding to the cache data, and tag data indicating respective addresses of the cache data. In other words, cache data is identical to one from among main data stored in the main memory 50, and the tag data indicates an actual address of the main memory 50 in which a corresponding cache data is stored. Furthermore, the priority data may be determined based on data regarding priorities of the main data stored in a priority table. For example, as shown in FIG. 3, if priority data of main data corresponding to data ID 2 is set to 4 in a priority table, priority data of cache data CD1 identical to the main data corresponding to the data ID2 is also set to 4.

Meanwhile, structure of the cache memory 230 will be described below in detail with reference to FIG. 3.

Referring to FIG. 3, the cache memory 230 includes a plurality of data sets. Here, one data set 335 includes a plurality of tag data, a plurality of cache data, and a plurality of priority data. For example, if the cache memory 230 is a 4-way set-related cache memory, one data set may include first through fourth cache data CD1, CD2, CD3, and CD4 and may include first through fourth tag data TD1, TD2, TD3, and TD4 respectively indicating addresses of the first through fourth cache data CD1, CD2, CD3, and CD4. Furthermore, the data set may further include first through fourth priority data P1, P2, P3, and P4 indicating respective priorities of the first through fourth cache data CD1, CD2, CD3, and CD4.

Meanwhile, the cache memory 230 may include a cache unit 232 in which cache data is stored, a tag unit 231 in which tag data is stored, and a P-region 233 in which priority data is stored, where the P-region 233 may be included in the tag unit 231.

If one from among main data is requested, the controller 220 determines whether cache data corresponding to the request is stored in the cache memory 230. In other words, the controller 220 determines whether it is a cache hit or a cache miss. Based on a result of the determination, the controller 220 may delete one from among cache data included in a data set and updates the data set with new data. Detailed descriptions thereof will be given below with reference to FIG. 4.

Figure 4:
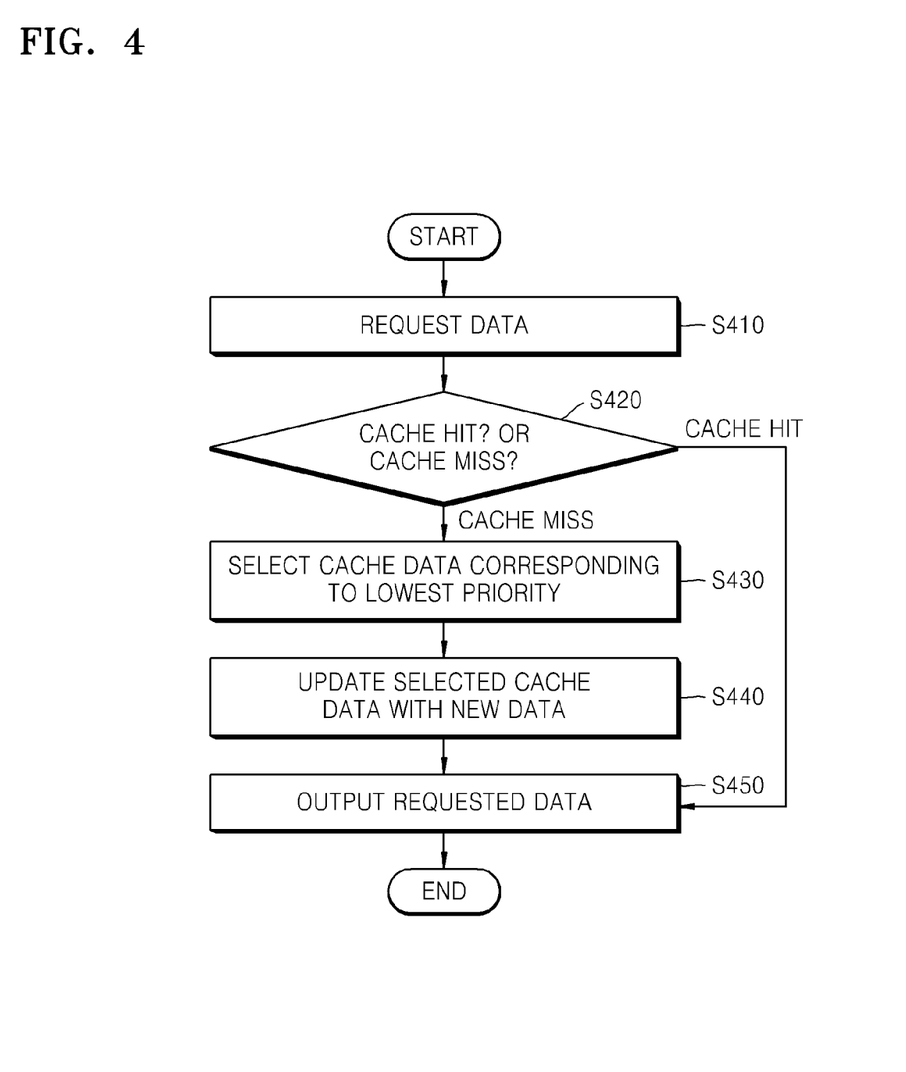
FIG. 4 is a flowchart showing a method of operating the cache memory system 200 according to an embodiment of the present disclosure.
Figure 5:
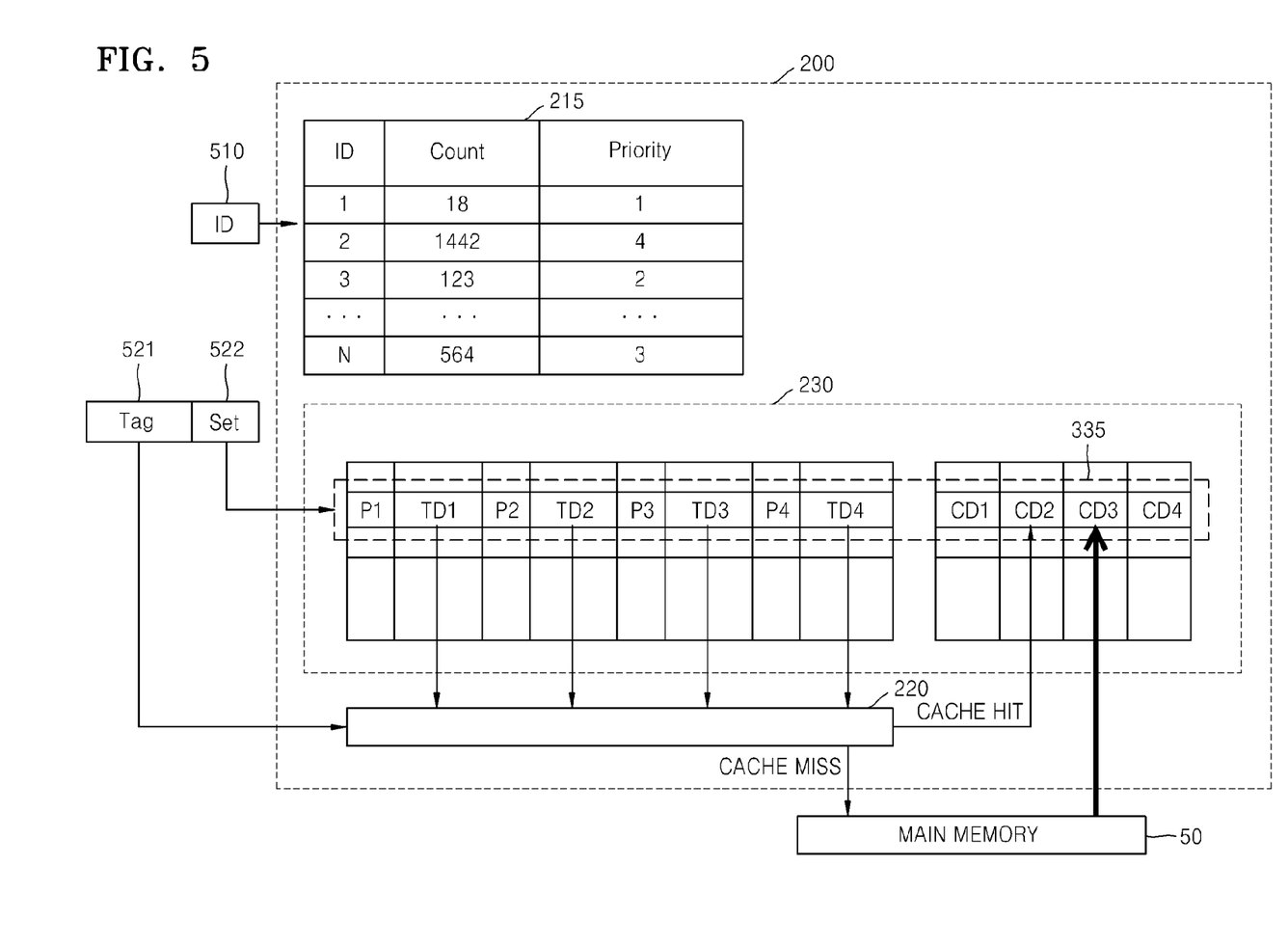
FIG. 5 is a diagram for describing the method shown in FIG. 4.

FIG. 4 is a flowchart showing a method of operating the cache memory system 200 according to an embodiment of the present disclosure, and FIG. 5 is a diagram for describing the method shown in FIG. 4.

Referring to FIG. 4, the cache memory system 200 may receive a data request from outside (operation S410). Here, requested data may be texture data (main data) to be used in pixel shading as described above with reference to FIG. 1, and the cache memory system 200 may receive a tag address 521 and a set address 522 regarding the main data, which are transmitted from outside, as shown in FIG. 5.

Meanwhile, the cache memory system 200 may also receive a data ID 510 other than the tag address 521 and the set address 522. Here, the cache memory system 200 may increase a data access count of main data corresponding to the received data ID 510 and update a priority table 215. The cache memory system 200 determines whether the requested data is stored in a cache memory or not, that is, whether it is a cache hit or a cache miss (operation S420). Here, as shown in FIG. 5, the controller 220 may compare the first through fourth tag data TD1, TD2, TD3, and TD4 included in a data set 335 indicated by the received set address 522 to the tag address 521 and determine whether cache data corresponding to the request is stored. If any of the first through fourth tag data TD1, TD2, TD3, and TD4 is identical to the tag address 521, the cache memory system 200 considers it as a cache hit. If none of the first through fourth tag data TD1, TD2, TD3, and TD4 is identical to the tag address 521, the cache memory system 200 considers it as a cache miss.

Meanwhile, if it is determined as a cache hit, the cache memory system 200 outputs cache data corresponding to the matched tag data (operation S450). For example, when the tag address 521 is identical to the second tag data TD2, the cache memory system 200 may output second cache data CD2 corresponding to the second tag data TD2.

On the contrary, if it is determined as a cache miss, the cache memory system 200 compares a plurality of priority data included in a set indicated by a received set address and selects cache data corresponding to the lowest priority (operation S430), deletes the selected cache data, and updates the cache data with new data (operation S440). For example, as shown in FIG. 5, the first through fourth priority data P1, P2, P3, and P4 respectively corresponding to the first through fourth cache data CD1, CD2, CD3, and CD4 included in the data set 335 indicated by the set address 522 may be compared to one another and cache data corresponding to the lowest priority may be selected. Here, if the third priority data P3 corresponds to the lowest priority, the cache memory system 200 may delete cache data corresponding to the third priority data P3 and updates the cache data with new data. The new data may be data received from a main memory region indicated by the tag address 521. Furthermore, the priority data P3 and the third tag data TD3 corresponding to the third cache data CD3 updated with the new data are updated.

For example, if the third cache data CD3 is updated with new data, priority data regarding the new data may be determined based on a priority table, and the third priority data P3 may be updated with the determined priority data.

Furthermore, the cache memory system 200 outputs the new data (operation S450).

Meanwhile, the cache memory system 200 may determine whether to store cache data in a temporary storage unit based on priority data regarding cache data to be deleted. Here, if the priority data regarding the cache data to be deleted is less than or equal to a predetermined value or is equal to or higher than the predetermined value, the cache memory system 200 may store the cache data to be deleted in a temporary storage unit. For example, if a value of a priority data decreases as a corresponding priority increases and priority data corresponding to a cache data to be deleted is smaller than or equal to a predetermined value, the cache data to be deleted may be stored in a temporary storage unit.

On the contrary, if a value of a priority data increases as a corresponding priority increases and priority data corresponding to a cache data to be deleted is equal to or greater than a predetermined value, the cache data to be deleted may be stored in a temporary storage unit.

Accordingly, if cache data to be deleted corresponds to a high priority, the cache data to be deleted is stored in a temporary storage unit. Therefore, when the cache data to be deleted is requested later, data may be obtained by accessing the temporary storage unit instead of a main memory, thereby increasing data processing speed.

The temporary storage unit may be able to store multiple blocks of data, and each block of data in the temporary storage unit may be manipulated independently from the remaining blocks of data in the temporary storage unit. Data in the temporary storage unit may be directly retrieved into cache memory.

Meanwhile, if a request for modifying the priority table 215, the cache memory system 200 may store the priority table 215 in an external memory. For example, if a shader program used by the pixel shader core 20 for performing pixel shading with respect to tiles is modified, the cache memory system 200 may receive a request for modifying the priority table 215.

Furthermore, if a first shader program is changed to a second shader program, the cache memory system 200 may store a first priority table corresponding to the first shader program, which is currently stored in the table storage unit 210, in an external memory and may store a second priority table corresponding to the second shader program in the table storage unit 210. When the second shader program is changed again to the first shader program later, the cache memory system 200 may store the first priority table, which is stored in the external memory, in the table storage unit 210 and determine priority data of a cache memory based on the first priority table.

Figure 6:
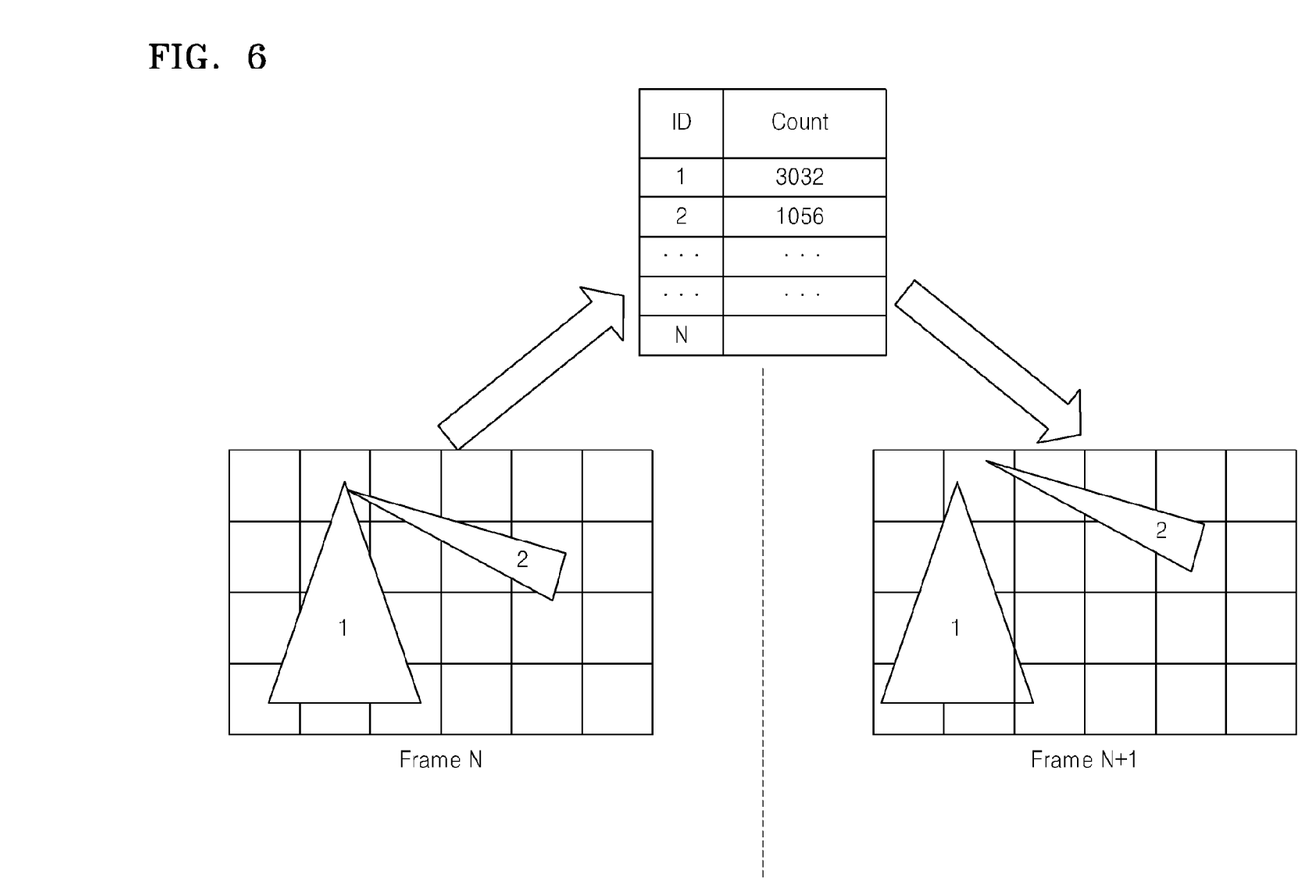
FIG. 6 is a diagram showing a method of collecting information regarding access frequencies according to an embodiment of the present disclosure.

FIG. 6 is a diagram showing a method of collecting information regarding access frequencies according to an embodiment of the present disclosure.

Referring to FIG. 6, information regarding access frequencies collected while pixels of an $N^{th}$ frame image are being processed at the pixel shader core 20 may be used for processing pixels of an $N+1^{th}$ frame image. For example, the pixel shader core 20 may request texture data (main data) necessary for processing pixels of the $N^{th}$ frame image to the cache memory system 200, and the cache memory system 200 may receive data ID corresponding to the request texture data (main data) and collect information regarding access frequencies with respect to the main data. Every time main data is requested, the cache memory system 200 may collect information regarding access frequencies with respect to the main data by updating a priority table stored in the table storage unit 210 by increasing data access count regarding data corresponding to requested main data.

Meanwhile, the information regarding access frequencies with respect to the main data corresponding to the $N^{th}$ frame image collected as described above may be used as information regarding access frequencies with respect to main data corresponding to the $N+1^{th}$ frame image. For example, as shown in FIG. 6, when pixels of the Nth frame image are being processed, if data access count regarding a first texture data corresponding to a data ID 1 is 3032 and data access count regarding a second texture data corresponding to a data ID 2 is 1056, a cache memory system used for processing pixels of an $N+1^{th}$ frame image may set data access count corresponding to a data ID 1 to 3032 and data access count corresponding to a data ID 2 to 1056 as initial values in a priority table.

Accordingly, initial values of a priority table stored in the cache memory system 200 corresponding to a pixel shader core for processing pixels of the $N+1^{th}$ frame image may be determined based on information regarding access frequencies collected while pixels of the $N^{th}$ frame image are being processed.

Furthermore, the cache memory system 200 may determine priority data corresponding to cache data based on the priority table set as described above. Since the $N^{th}$ frame image and the $N+1^{th}$ frame image are similar to each other, similar texture data is demanded for processing pixels of the $N^{th}$ frame image and the $N+1^{th}$ frame image. Therefore, reliability of priority data corresponding to cache data may be improved by using information regarding access frequencies with respect to texture data, which is collected while the $N^{th}$ frame image is being processed, when the $N+1^{th}$ frame image is processed. As a result, cache miss possibility may be reduced.

Figure 7:
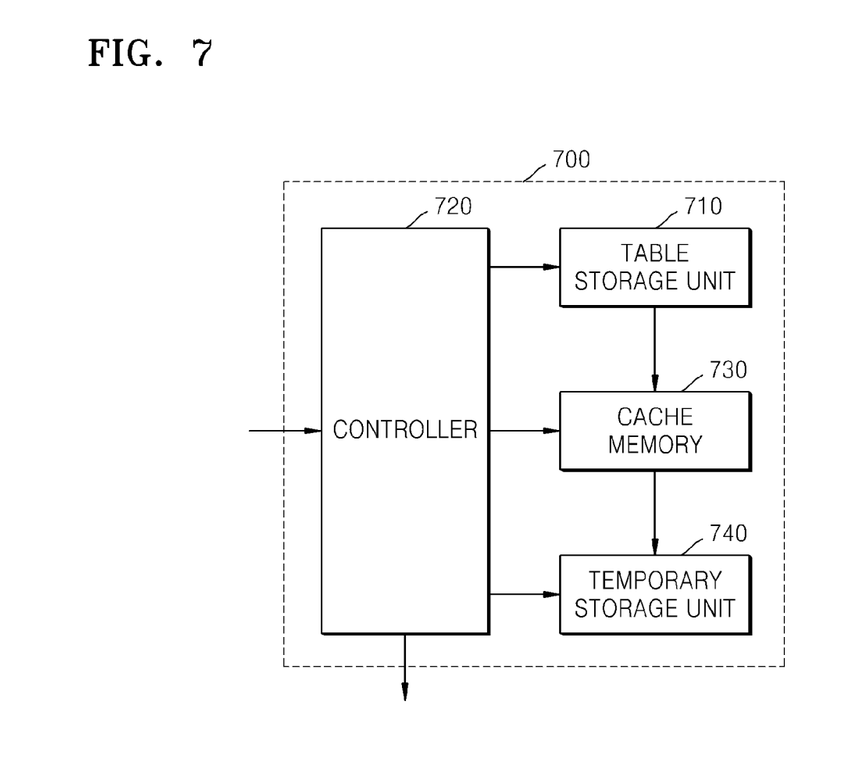
FIG. 7 is a block diagram showing a cache memory system according to an embodiment of the present disclosure.

FIG. 7 is a block diagram showing a cache memory system 700 according to an embodiment of the present disclosure.

Referring to FIG. 7, the cache memory system 700 may include a table storage unit 710, a cache memory 730, a controller 720, and a temporary storage unit 740. Here, the table storage unit 710, the cache memory 730, and the controller 720 are identical to the table storage unit 210, the cache memory 230, and the controller 220 as shown in FIG. 2. Therefore, detailed descriptions thereof will be omitted.

The table storage unit 710 may store a priority table including information regarding access frequencies with respect to main data (texture data) stored in the main memory 50.

The cache memory 730 may store cache data corresponding to portions of main data stored in the main memory 50, priority data respectively corresponding to the cache data, and tag data indicating respective addresses of the cache data. Furthermore, the cache memory 730 includes a plurality of data sets. Here, one data set 335 includes a plurality of tag data, a plurality of cache data, and a plurality of priority data If one from among main data is requested, the controller 720 determines whether cache data corresponding to the request is stored in the cache memory 730. In other words, the controller 720 determines whether it is a cache hit or a cache miss. Based on a result of the determination, the controller 720 may delete one block from among cache data included in a data set and updates the data set with new data. Here, the cache data to be deleted from among the plurality of cache data included in the data set may be selected according to a predetermined criterion. For example, the cache data to be deleted may be selected based on least recently used (LRU) criterion for selecting cache data that is the least frequently accessed, most recently used (MRU) criterion for selecting cache data that is the most recently accessed, or first in first out (FIFO) criterion for selecting cache data that is stored first.

The temporary storage unit 740 may store the selected cache data (cache data to be deleted) based on priority data corresponding to the selected cache data. Detailed descriptions thereof will be given below with reference to FIGS. 8 and 9.

Figure 8:
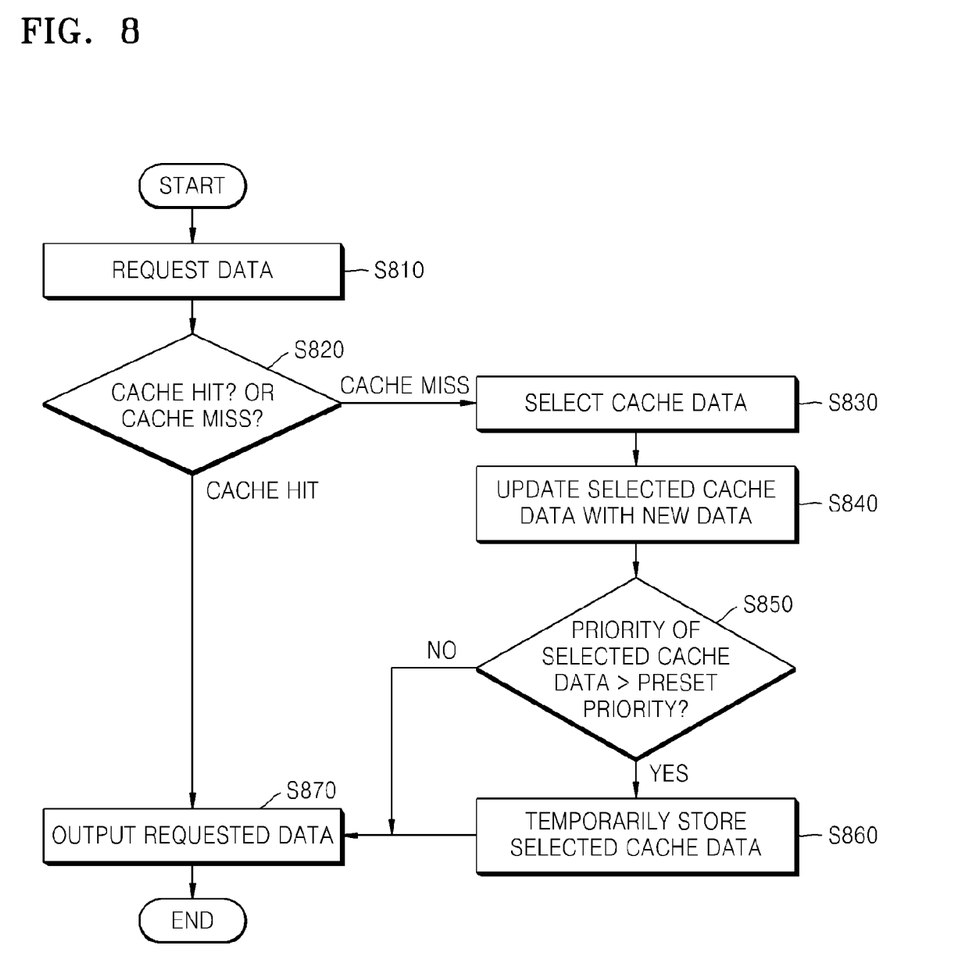
FIG. 8 is a flowchart showing a method of operating a cache memory system according to an embodiment of the present disclosure.
Figure 9:
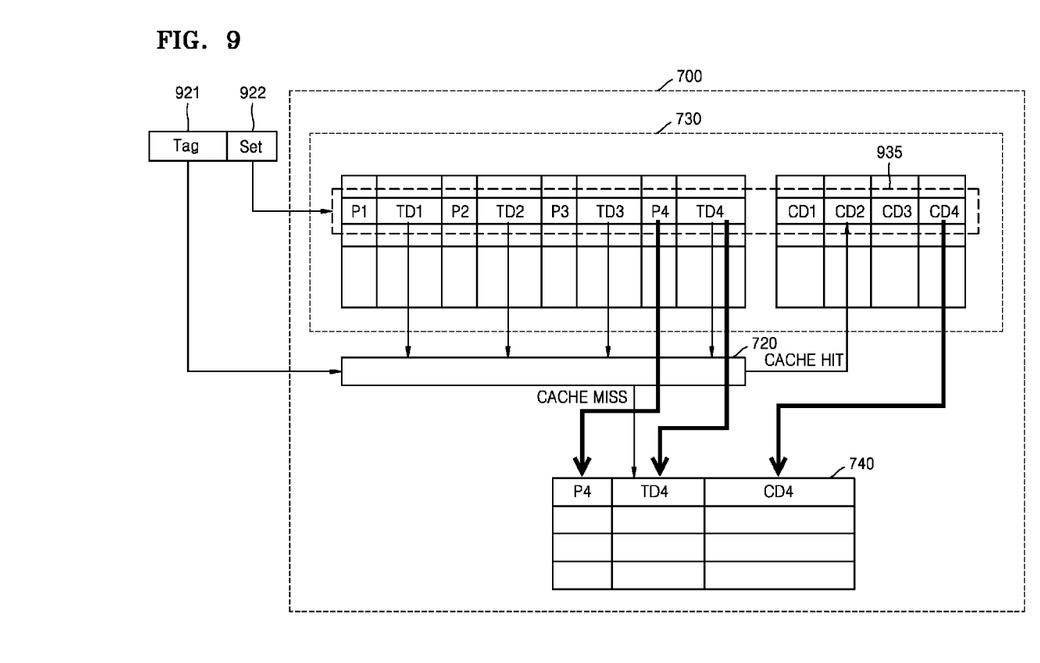
FIG. 9 is a diagram for describing the method shown in FIG. 8.

FIG. 8 is a flowchart showing a method of operating a cache memory system 700 according to an embodiment of the present disclosure, and FIG. 9 is a diagram for describing the method shown in FIG. 8.

Referring to FIG. 8, the cache memory system 700 may receive a data request (operation S810). Here, requested data may be texture data (main data) to be used in pixel shading as described above with reference to FIG. 1, and the cache memory system 700 may receive a tag address 921 and a set address 922 regarding the main data, which are transmitted from outside the cache memory system 700.

Meanwhile, the cache memory system 700 may also receive a data ID other than the tag address 921 and the set address 922. Here, the cache memory system 700 may increase a data access count regarding main data corresponding to the received data ID 910 and update a priority table 715. The cache memory system 700 determines whether the requested data is stored in a cache memory or not, that is, whether it is a cache hit or a cache miss (operation S820).

Here, as shown in FIG. 9, the cache memory system 700 may compare the first through fourth tag data TD1, TD2, TD3, and TD4 included in a data set 935 indicated by the received set address 922 to the tag address 921 and determine whether cache data corresponding to the request is stored. If any of the first through fourth tag data TD1, TD2, TD3, and TD4 is identical to the tag address 921, the cache memory system 700 considers it as a cache hit. If none of the first through fourth tag data TD1, TD2, TD3, and TD4 is identical to the tag address 921, the cache memory system 700 considers it as a cache miss.

Meanwhile, if it is determined as a cache hit, the cache memory system 700 outputs cache data corresponding to the matched tag data (operation S870). For example, when the tag address 921 is identical to the second tag data TD2, the cache memory system 700 may output second cache data CD2 corresponding to the second tag data TD2 to outside.

On the contrary, if it is determined as a cache miss, the cache memory system 700 selects one from among the first through fourth cache data CD1, CD2, CD3, and CD4 included in the data set 935 indicated by the received tag address 921 (operation S830), deletes the selected cache data, and updates the cache data with new data (operation S840). Here, the cache data to be deleted may be selected based on criteria as described above with reference to FIG. 7, such as the LRU criterion, the MRU criterion, or the FIFO criterion. Furthermore, priority data and tag data corresponding to the cache data updated with new data are updated.

Meanwhile, the cache memory system 700 may determine whether to store cache data in a temporary storage unit based on priority data regarding cache data to be deleted (operation S850). Here, if the priority data regarding the cache data to be deleted is equal to or higher than the predetermined value, the cache memory system 700 may store the cache data to be deleted in a temporary storage unit (operation S860).

As shown in FIG. 9, if the fourth cache data CD4 is selected to be deleted and priority data corresponding to the fourth cache data CD4 is higher than a predetermined priority, the cache memory system 700 may store the fourth cache data CD4 in the temporary storage unit 740. Here, the cache memory system 700 may also store the fourth priority data P4 and the fourth tag data TD4 corresponding to the fourth cache data CD4 in the temporary storage unit 740.

If the priority data regarding the cache data to be deleted is less than or equal to a predetermined value or is equal to or higher than the predetermined value, the cache memory system 700 may store the cache data to be deleted in a temporary storage unit. For example, if value of a priority data decreases as corresponding priority increases and priority data corresponding to a cache data to be deleted is smaller than or equal to a predetermined value, the cache data to be deleted may be stored in the temporary storage unit 740. On the contrary, if value of a priority data increases as corresponding priority increases and priority data corresponding to a cache data to be deleted is equal to or greater than a predetermined value, the cache data to be deleted may be stored in the temporary storage unit 740.

Alternatively, a priority corresponding to the cache data to be deleted may be compared to priorities corresponding to candidate data already stored in the temporary storage unit 740, and, if the priority corresponding to the cache data to be deleted is higher than the priorities corresponding to the candidate data, the cache data to be deleted may be stored in the temporary storage unit 740.

As described above, if cache data to be deleted corresponds to a high priority, the cache data to be deleted is stored in the temporary storage unit 740. Therefore, when the cache data to be deleted is requested later, data may be obtained by accessing the temporary storage unit 740 instead of a main memory, thereby increasing data processing speed.

For example, if requested main data does not exist in a cache memory, the controller 720 may determine whether the requested main data exists in the temporary storage unit 740. Here, it may be determined whether the requested main data exists in the temporary storage unit 740 by comparing tag data respectively corresponding to candidate data stored in the temporary storage unit 740 to a tag address. If any of tag data is identical to the tag address, candidate data corresponding to the matched tag data (that is, the requested main data) may be output.

On the contrary, if none of tag data is identical to the tag address, data may be received from a main memory region indicated by the tag address and output.

As described above, according to the one or more of the above embodiments of the present disclosure, when there is a cache miss, cache data to be deleted is selected based on priority data regarding the cache data, thereby reducing cache miss possibility.

As cache miss possibility is reduced, power consumed for accessing an external memory may be reduced.

Furthermore, by temporarily storing a portion of cache data to be deleted, power consumed for accessing an external memory may be further reduced.

In addition, other embodiments of the present disclosure can also be implemented through computer readable code/instructions in/on a medium, e.g., a computer readable medium, to control at least one processing element to implement any above described embodiment. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present disclosure. The media may also be a distributed network, so that the computer readable code is stored/transferred and executed in a distributed fashion.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A cache memory system comprising:
   a cache memory, which stores cache data corresponding to portions of main data stored in a main memory, tag data respectively corresponding to the cache data, and priority data respectively corresponding to the cache data, and comprises a plurality of data sets comprising the cache data, the tag data and the priority data;
   a table storage unit, which stores a priority table comprising information regarding access frequencies with respect to the main data; and
   a controller, which, when at least one block from among the main data is requested for processing a first frame, receives a tag address and a set address corresponding to the requested data, determines whether cache data corresponding to the requested data is stored in the cache memory by comparing the tag data included in a data set indicated by the set address to the tag address, and
   based on the determination, determines one block having a lowest priority among the cache data included in the data set based on the priority data, deletes the determined cache data, and updates the cache data with new data,
   wherein the priority data is determined based on the information regarding access frequencies, the information regarding access frequencies including first information regarding access frequencies with respect to the requested at least one block, and
   the first information regarding access frequencies with respect to the requested at least one block is based on access frequencies corresponding to a second frame, the second frame preceding the first frame.

2. The cache memory system of claim 1, wherein, if any of the tag data is identical to the tag address, the controller determines a cache hit and outputs the cache data corresponding to the tag data identical to the tag address.

3. The cache memory system of claim 1, wherein, if none of the tag data is identical to the tag address, the controller determines a cache miss and receives the new data from a main memory region indicated by the tag address.

4. The cache memory system of claim 1, wherein the priority table comprises a data identifier (ID) indicating the main data and a data access count regarding the main data, and the controller determines the priority data, such that priority of the cache data identical to the main data increases as the data access count regarding the main data increases.

5. The cache memory system of claim 4, wherein the controller receives a data ID corresponding to the requested main data and updates the priority table by increasing the data access count regarding the main data corresponding to the received data ID.

6. The cache memory system of claim 5, wherein the controller updates the priority data based on the updated priority table.

7. The cache memory system of claim 1, wherein, if a table modification request is received, the controller stores the priority table in an external memory and stores a modified priority table in the table storage unit.

8. The cache memory system of claim 1, wherein,
if the requested main data is data necessary for processing pixels of an $N+1^{th}$ frame image, initial information regarding access frequencies of the priority table comprises information regarding access frequencies collected while pixels of an $N^{th}$ frame image are being processed.

9. The cache memory system of claim 1, wherein the cache memory system comprises a graphics processing system that further comprises a rasterizer and a plurality of pixel shaders that respectively request texture data, as requested main data, from the main memory that is exterior to the graphics processing system.

10. A method of operating a cache memory system, the method comprising:
receiving a tag address and a set address corresponding to a requested data for processing a first frame;
determining whether the requested data is stored in a cache memory by comparing a plurality of tag data included in a data set indicated by the set address to the tag address, the cache memory storing cache data;
based on a result of the determination, determining one block having a lowest priority among a plurality of cache included in the data set based on priority data respectively corresponding to the cache data; and
deleting the determined cache data and updating the cache data with new data,
wherein the priority data is determined based on information regarding access frequencies included in a priority table, the information regarding access frequencies includes first information regarding access frequencies with respect to the requested data, and
the first information regarding access frequencies with respect to the requested data is based on access frequencies corresponding to a second frame, the second frame preceding the first frame.

11. The method of claim 10, further comprising determining the priority data, such that priority of the cache data identical to the main data increases as a data access count regarding the main data increases.

12. The method of claim 11, wherein the receiving of the request comprises receiving a data identifier (ID) corresponding to the requested main data,
further comprising updating the priority table by increasing the data access count regarding the main data corresponding to the data ID.

13. The method of claim 10, further comprising storing the cache data to be deleted as candidate data based on priority data corresponding to the cache data to be deleted.

14. The method of claim 10, further comprising receiving a table modification request; and
storing the priority table in an external memory and storing a modified priority table in a table storage unit.

15. A cache memory system comprising:
a cache memory, which stores cache data corresponding to portions of main data stored in a main memory, tag data respectively corresponding to the cache data, and priority data respectively corresponding to the cache data and comprises a plurality of data sets comprising the cache data, the tag data and the priority data;
a table storage unit, which stores a priority table comprising information regarding access frequencies with respect to the main data;
a controller, which, when at least one portion from among the main data is requested for processing a first frame, receives a tag address and a set address corresponding to the requested data, determines whether cache data corresponding to the request is stored in the cache memory by comparing the tag data included in a data set indicated by the set address to the tag address, and based on the determination, determines one block having a lowest priority among the cache data included the data set based on the priority data, deletes the determined cache data, and updates the cache data with new data; and
a temporary storage unit, which stores the cache data deleted from the cache memory as candidate data based on priority data corresponding to the cache data to be deleted,
wherein the priority data is determined based on the information regarding access frequencies, the information regarding access frequencies including first information regarding access frequencies with respect to the requested at least one portion from among the main data, and
the first information regarding access frequencies with respect to the requested at least one portion from among the main data is based on access frequencies corresponding to a second frame, the second frame preceding the first frame.

16. The cache memory system of claim 15, wherein, if a priority of the determined cache data is equal to or greater than a predetermined priority, the controller stores the cache data to be deleted in the temporary storage unit as candidate data.

17. The cache memory system of claim 15, wherein, if the requested data does not exist in the cache memory, the controller determines whether the requested main data exists in the temporary storage unit and, based on a result of determining whether the requested main data exists in the temporary storage unit, outputs the candidate data or the main data in the main memory.

18. The cache memory system of claim 15, wherein the cache data comprises texture data.

19. A non-transitory computer-readable recording medium storing a program to implement a method of operating a cache memory system, the method comprising:
receiving a tag address and a set address corresponding to a requested data for processing a first frame;
determining whether the requested data is stored in a cache memory by comparing a plurality of tag data included in a data set indicated by the set address to the tag address, the cache memory storing cache data;
based on a result of the determination, determining one block having a lowest priority among a plurality of cache included in the data set based on priority data respectively corresponding to the cache data; and deleting the cache data and updating the cache data with new data,
wherein the priority data is determined based on information regarding access frequencies included in a priority table, the information regarding access frequencies includes first information regarding access frequencies with respect to the requested data, and
the first information regarding access frequencies with respect to the requested data is based on access frequencies corresponding to a second frame, the second frame preceding the first frame.

20. A cache memory system comprising:
a cache memory, which stores cache data corresponding to portions of main data stored in a main memory and priority data respectively corresponding to the cache data;
a table storage unit, which stores a priority table comprising information regarding access frequencies with respect to the main data; and
a controller, which, when at least one block from among the main data is requested, determines whether cache data corresponding to the request is stored in the cache memory, and based on the determination, deletes one block from among the cache data based on the priority data, and updates the cache data with new data,
wherein the priority data is determined based on the information regarding access frequencies, and
wherein the information regarding access frequencies with respect to requested main data for processing an image comprises information regarding access frequencies with respect to the main data set during a processing of another image.

21. The cache memory system of claim 20, further comprising a temporary storage unit, which stores the cache data deleted from the cache memory as candidate data,
wherein the controller determines whether to store the cache data to be deleted as candidate data based on the priority data corresponding to the cache data to be deleted.

22. A method of operating a cache memory system, the method comprising:
receiving a request for one block from among main data;
determining whether the requested main data is stored in a cache memory;
based on a result of the determination, selecting one block from among cache data stored in the cache memory based on priority data respectively corresponding to the cache data;
deleting the selected cache data and updating the cache data with new data; and setting initial information regarding access frequencies with respect to the requested main data for processing an image to information regarding access frequencies with respect to main data for processing another image,
wherein the priority data is determined based on the information regarding access frequencies included in a priority table.

* * * * *